United States Patent
Kajita et al.

(10) Patent No.: US 10,650,775 B2
(45) Date of Patent: May 12, 2020

(54) DISPLAY CONTROL DEVICE

(71) Applicants: DENSO CORPORATION, Kariya, Aichi-pref. (JP); TOYOTA JIDOSHA KABUSHIKI KAISHA, Toyota-shi, Aichi-ken (JP)

(72) Inventors: Kentaro Kajita, Kariya (JP); Hitoshi Hoshino, Kariya (JP); Toshinori Aoki, Toyota (JP); Takashi Yanatsubo, Toyota (JP); Norikatsu Mio, Toyota (JP)

(73) Assignees: DENSO CORPORATION, Kariya, Aichi-pref. (JP); TOYOTA JIDOSHA KABUSHIKI KAISHA, Toyota-shi, Aichi-ken (JP)

( * ) Notice: Subject to any disclaimer, the term of this patent is extended or adjusted under 35 U.S.C. 154(b) by 0 days.

(21) Appl. No.: 16/159,857

(22) Filed: Oct. 15, 2018

(65) Prior Publication Data

US 2019/0114988 A1 Apr. 18, 2019

(30) Foreign Application Priority Data

Oct. 18, 2017 (JP) .................. 2017-201887

(51) Int. Cl.
*G09G 5/00* (2006.01)
*B60K 35/00* (2006.01)
*G09G 5/10* (2006.01)

(52) U.S. Cl.
CPC ............ *G09G 5/003* (2013.01); *B60K 35/00* (2013.01); *G09G 5/10* (2013.01); *B60K 2370/1523* (2019.05); *B60K 2370/171* (2019.05); *B60K 2370/186* (2019.05); *B60K 2370/331* (2019.05); *B60K 2370/52* (2019.05); *G09G 2320/0247* (2013.01); *G09G 2380/10* (2013.01)

(58) Field of Classification Search
CPC .......... G09G 5/003; G09G 5/10; G09G 1/146; G09G 2380/10; B60K 35/00; B60K 2370/52

See application file for complete search history.

(56) References Cited

U.S. PATENT DOCUMENTS

2012/0169997 A1* 7/2012 Iwaki ..................... A61B 5/161
351/239
2012/0236200 A1* 9/2012 Johnson ................. G09G 5/005
348/441

FOREIGN PATENT DOCUMENTS

JP 2009-107409 A 5/2009

* cited by examiner

*Primary Examiner* — Grace Q Li
(74) *Attorney, Agent, or Firm* — Harness, Dickey & Pierce, P.L.C.

(57) ABSTRACT

A display control device includes an image creating unit, a display output unit, an update time measuring unit, and a blinking control unit. The blinking control unit determines a bright time and a dark time to be integral multiples of an update time so that a blinking frequency is within a tolerance frequency range. In a blinking control, the blinking control unit executes an on-display control to instruct the image creating unit to create a bright image for a number of times of a value obtained by dividing the bright time by the update time, and then executes an off-display control to instruct the image creating unit to create the dark image for a number of times of a value obtained by dividing the dark time by the update time, and repeats the on-display control and the off-display control until the blinking control ends.

8 Claims, 6 Drawing Sheets

| UPDATE TIME (ms) | BLINKING PATTERN | ON-TIME (ms) | OFF-TIME (ms) | BLINKING PERIOD (ms) | BLINKING FREQUENCY (Hz) |
|---|---|---|---|---|---|
| 33.3 | PATTERN 5 | 133.2 | 133.2 | 266.4 | 3.754 |
| 50.0 | PATTERN 4 | 150.0 | 100.0 | 250.0 | 4.000 |
| 66.7 | PATTERN 3 | 133.2 | 133.2 | 266.4 | 3.754 |
| 83.3 | PATTERN 2 | 166.6 | 83.3 | 249.9 | 4.002 |
| 100.0 | PATTERN 2 | 200.0 | 100.0 | 300.0 | 3.333 |
| 116.7 | PATTERN 1 | 116.7 | 116.7 | 233.4 | 4.284 |
| 133.3 | PATTERN 1 | 133.3 | 133.3 | 266.6 | 3.751 |
| 150.0 | PATTERN 1 | 150.0 | 150.0 | 300.0 | 3.333 |

FIG. 7

| BLINKING PATTERN | NUMBER OF TIMES OF ON-IMAGE | NUMBER OF TIMES OF OFF-IMAGE |
|---|---|---|
| PATTERN 1 | 1 | 1 |
| PATTERN 2 | 2 | 1 |
| PATTERN 3 | 2 | 2 |
| PATTERN 4 | 3 | 2 |
| PATTERN 5 | 4 | 4 |

DISPLAY CONTROL DEVICE

CROSS REFERENCE TO RELATED APPLICATION

The present application is based on and claims priority to Japanese Patent Application No. 2017-201887 filed on Oct. 18, 2017, the disclosure of which is incorporated herein by reference.

TECHNICAL FIELD

The present disclosure relates to a display control device.

BACKGROUND

A display control device capable of blinking an image is widely known. For example, JP 2009-107409 A discloses a vehicle display device that blinks a warning symbol.

SUMMARY

An image displayed on a display unit is updated at a constant period. Because the image displayed on the display unit is updated at the constant update period, if the image is being blinking, the image changes from a light-on state to a light-off state or vice versa, from the light-off state to the light-on state at the constant update period.

The period of changing the blinking image from the light-on state to the light-off state or vice versa, from the light-off state to the light-on state may fluctuate due to an influence of a fluctuation in a processing load of either or both of a hardware and a software. That is, even if the blinking period is set to the constant time, the actual blinking period may fluctuate due to the influence of the fluctuation in the processing load. If the fluctuation in the blinking period is large, a viewer of the display unit may feel uncomfortable.

It is an object of the present disclosure to provide a display control device that is less likely to give an uncomfortable feeling to a viewer of a display unit during blinking display.

According to an aspect of the present disclosure, a display control device for displaying an image on the display unit includes an image creating unit, a display output unit, an update time measuring unit, and a blinking control unit. The image creating unit creates a bright image and a dark image included in the image. The display output unit displays the image created by the image creating unit on the display unit. The update time measuring unit measures an update time that is a time from when the image displayed on the display unit is updated until the image is updated next time. The blinking control unit executes a blinking control in which the bright image and the dark image are alternately output to the display unit. The blinking control unit determines a bright time during which the bright image is displayed on the display unit and a dark time during which the dark image is displayed on the display unit to be integral multiples of the update time measured by the update time measuring unit in such a manner that a blinking frequency determined from a sum of the bright time and the dark time is within a tolerance frequency range determined based on a predetermined target blinking frequency. When the blinking control unit executes the blinking control, the blinking control unit executes an on-display control to instruct the image creating unit to create the bright image for a number of times of a value obtained by dividing the bright time by the update time, and then executes an off-display control to instruct the image creating unit to create the dark image for a number of times of a value obtained by dividing the dark time by the update time, and repeats the on-display control and the off-display control until the blinking control ends.

In the display control device, the update time is measured by the update time measuring unit. Then, the blinking control unit determines the bright time and the dark time to be integral multiples of the update time. Accordingly, a difference between a time during which the bright image is actually displayed on the display unit and the determined bright time and a difference between a time during which the dark image is actually displayed on the display unit and the determined dark time can be reduced. The bright time and the dark time are determined in such a manner that the blinking frequency determined from the sum of the bright time and the dark time falls within the tolerance frequency range determined based on the target blinking frequency. Therefore, the actual blinking frequency also falls within the tolerance frequency range. That is, a fluctuation in the blinking frequency is suppressed. Therefore, the display control device is unlikely to give an uncomfortable feeling to a viewer of the display unit.

BRIEF DESCRIPTION OF THE DRAWINGS

Additional objects and advantages of the present disclosure will be more readily apparent from the following detailed description when taken together with the accompanying drawings. In the drawings.

DETAILED DESCRIPTION

Figure 1:
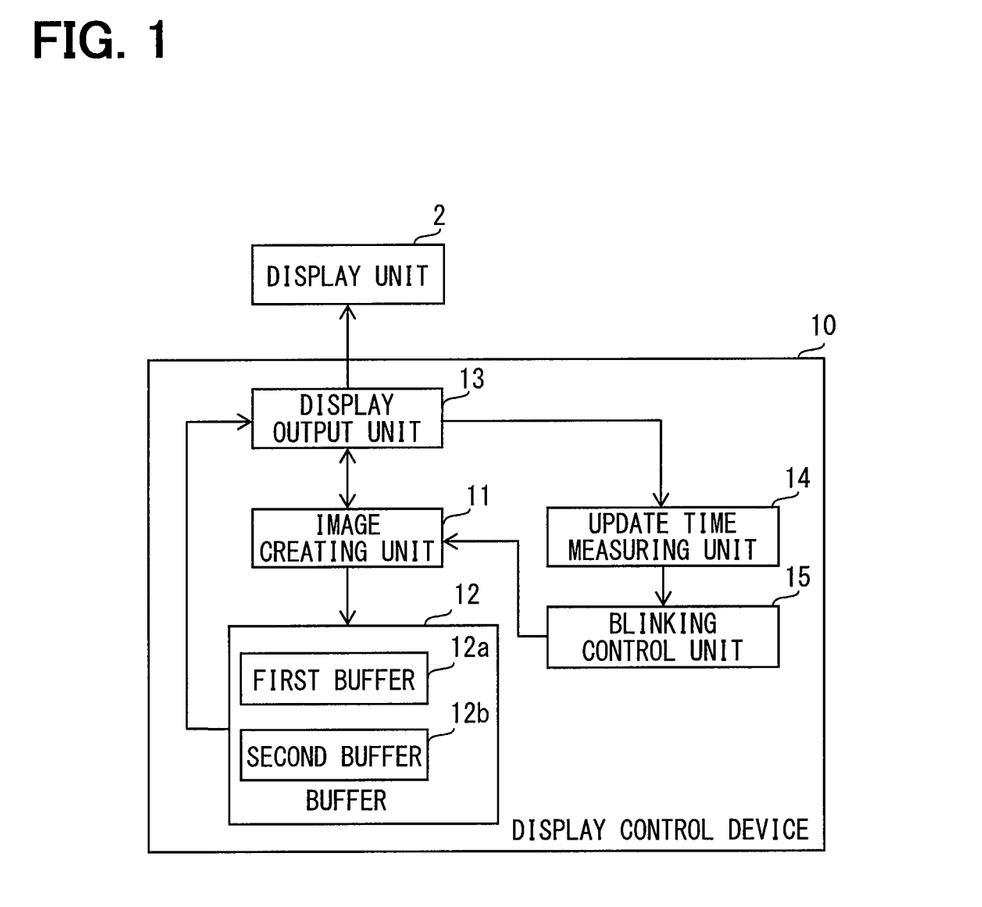
FIG. 1 is a block diagram of a display system including a display control device according to an embodiment of the present disclosure.

Hereinafter, embodiments will be described with reference to the drawings. FIG. 1 is a block diagram showing a configuration of a display system 1 including a display control device 10 according to an embodiment. The display system 1 includes a display unit 2 and the display control device 10. The display system 1 according to the present embodiment is installed in a vehicle.

Figure 2:
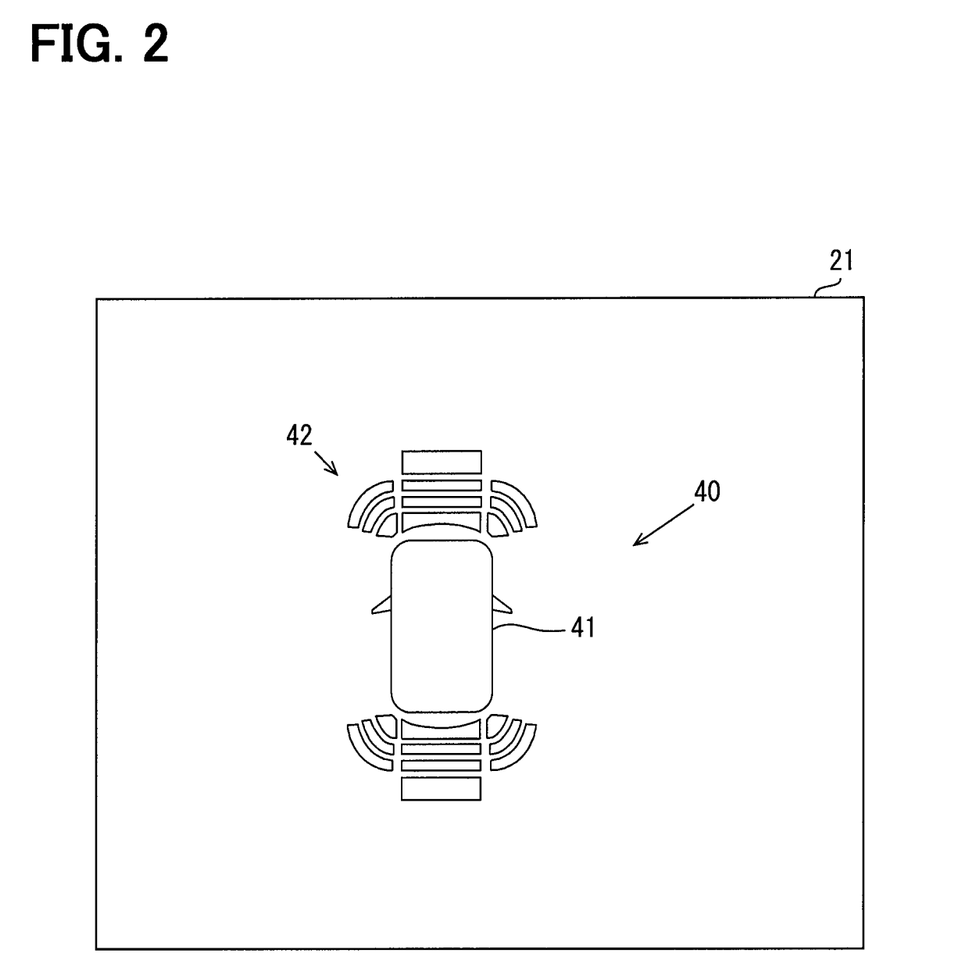
FIG. 2 is a diagram in which a sonar detection image is displayed on a display screen.

The display unit 2 is installed at a position visible to a driver in a vehicle interior of the vehicle and has a display screen 21 (see FIG. 2). The display screen 21 displays an image. The display screen 21 can switch and display an on-image and an off-image which will be described later.

FIG. 2 shows an example of an image displayed on the display screen 21. FIG. 2 is a diagram in which a sonar detection image 40 is displayed on the display screen 21. The sonar detection image 40 is an image showing a direction and a distance of an obstacle detected by sonar installed in the vehicle. In the sonar detection image 40, an obstacle notifying FIG. 42 for indicating the direction and the distance of the detected obstacle is arranged around a vehicle FIG. 41 that represents the vehicle. The obstacle notifying FIG. 42 includes a plurality of elements arranged in front of and behind the vehicle FIG. 41. Among the elements included in the obstacle notifying FIG. 42, the direction and the number of lighting elements indicate the direction and the distance of the obstacle detected by the sonar. In addition, when the distance to the obstacle is short, specifically, when the distance to the obstacle is equal to or less than a blinking threshold distance, the obstacle notifying FIG. 42 is blinked.

Return to the description of FIG. 1. The display control device 10 is a computer including a CPU, a ROM, a RAM, an I/O, and a bus line for connecting these components. In the ROM, a program for making a general-purpose computer function as the display control device 10 is stored. The CPU executes the program stored in the ROM while utilizing a temporary storage function of the RAM so that the display control device 10 functions as an image creating unit 11, a display output unit 13, an update time measuring unit 14, and a blinking control unit 15. When the above-described functions are executed, a method corresponding to the program is executed. It should be noted that a storage medium for storing the program executed by the CPU is not limited to the ROM but may be stored in a non-transitory tangible storage medium. For example, the program may be stored in a flash memory.

A part or all of the functions of the display control device 10 may be realized by using one or more ICs or the like (in other words, as hardware). In addition, a part or all of the functions of the display control device 10 may be realized by a combination of software execution by the CPU and hardware components.

The image creating unit 11 sequentially creates images to be displayed on the display screen 21 in a buffer 12. The buffer 12 is, for example, a part of a storage area of the RAM. The buffer 12 according to the present embodiment includes a first buffer 12a and a second buffer 12b. Both of the first buffer 12a and the second buffer 12b can store images for one time displayed on the display screen 21.

Various kinds of information (hereinafter, image creation information) necessary for creating images are input to the image creating unit 11. The image creating unit 11 sequentially creates images to be displayed on the display screen 21 based on the image creation information. The sonar detection image 40 shown in FIG. 2 is also created by the image creating unit 11.

The display output unit 13 periodically outputs the image created in the buffer 12 by the image creating unit 11 to the display unit 2. The period at which the display output unit 13 outputs the image to the display unit 2 is set to a constant period, and for each period, the display output unit 13 alternately outputs the image created in the first buffer 12a and the image created in the second buffer 12b to the display unit 2. Although the period at which the display output unit 13 outputs the image is set to the constant period, a period at which the image displayed on the display unit 2 is updated fluctuates due to a fluctuation in processing loads of the hardware and the software included in the display control device 10. In the following description, a time from when the image displayed on the display unit 2 is updated until the image is updated next time is referred to as an update time.

When the image displayed on the display screen 21 is blinked, there is a possibility that a blinking period fluctuates due to the fluctuation in the update time. If the fluctuation in the blinking period is large, a viewer of the display screen 21 may feel uncomfortable. Therefore, in the present embodiment, in order to suppress the fluctuation in the blinking period, the update time measuring unit 14 and the blinking control unit 15 are provided.

The update time measuring unit 14 measures the update time. The blinking control unit 15 executes a control for blinking the image displayed on the display unit 2 (hereinafter referred to as a blinking control). The blinking control is a control of alternately displaying a bright image in which a blinking portion is in a bright state and a dark image in which the blinking portion is in a dark state in the image displayed on the display screen 21 in the display unit 2.

Figure 3:
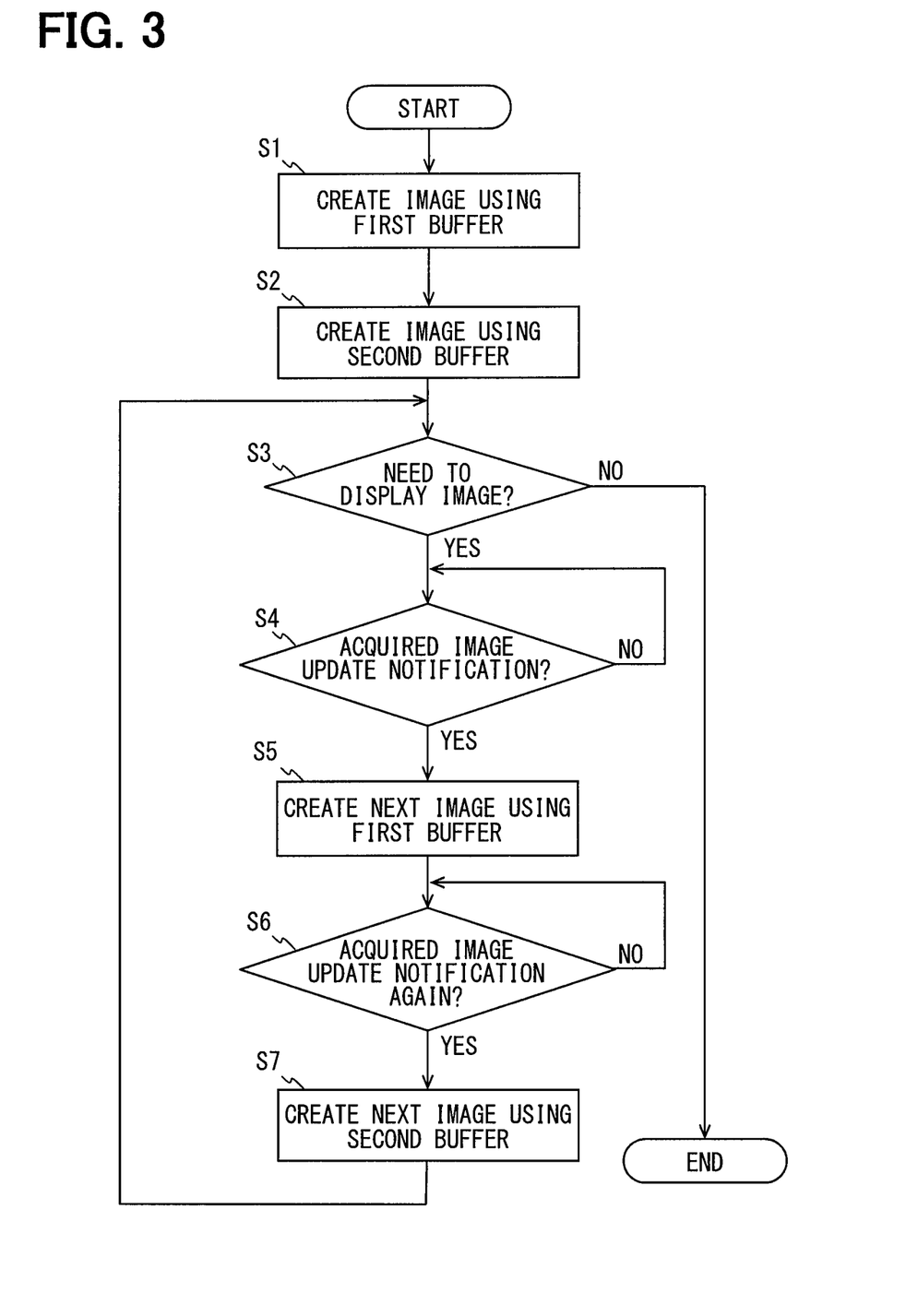
FIG. 3 is a flowchart showing a processing executed by an image creating unit in FIG. 1.

Next, the control executed by the display control device 10 will be described in detail using the flowcharts. FIG. 3 shows the processing executed by the image creating unit 11. The image creating unit 11 periodically executes the processing shown in FIG. 3 when needs to create the image to be displayed on the display screen 21.

At S1, the image creating unit 11 creates the image to be displayed on the display screen 21 using the first buffer 12a. After the image creating unit 11 creates the image, the processing proceeds to S2. At S2, using the second buffer 12b, the image creating unit 11 creates an image to be displayed on the display screen 21 at the next update timing after the image created at S1 is displayed on the display screen 21. The contents of the image to be created in the first buffer 12a and the second buffer 12b are determined based on the image creation information input to the image creating unit 11.

At S3, the image creating unit 11 determines whether the display control device 10 still needs to display the image on the display screen 21. If the determination result at S3 is NO, the processing shown in FIG. 3 ends. On the other hand, if the determination result at S3 is YES, the processing proceeds to S4.

At S4, the image creating unit 11 determines whether the image creating unit 11 has acquired an image update notification. The image update notification is output from the display output unit 13 to the image creating unit 11 when the display output unit 13 updates the image displayed on the display screen 21, that is, when the display output unit 13 outputs a new image created in the buffer 12 to the display unit 2. If the determination result at S4 is NO, the image creating unit 11 repeats the determination at S4. If the determination result at S4 is YES, the processing proceeds to S5.

When the image creating unit 11 has acquired the image update notification, the image data stored in the first buffer 12a is unnecessary. Therefore, at S5, using the first buffer 12a, the image creating unit 11 creates an image to be displayed on the display screen 21 next to the image stored in the second buffer 12b.

At S6, the image creating unit 11 determines whether the image creating unit 11 has acquired an image update notification again. If the determination result at S6 is NO, the processing repeats the determination at S6. If the determination result at S6 is YES, the processing proceeds to S7.

When the processing proceeds to S7, the image data created in the second buffer 12b is unnecessary. Therefore, at S7, using the second buffer 12b, the image creating unit 11 creates an image to be displayed on the display screen 21 next to the image stored in the first buffer 12a.

After executing S7, the processing returns to S3. While the display control device 10 needs to display the image on the display screen 21, the image creating unit 11 continues to create new images for updating the image to be displayed on the display screen 21 using the first buffer 12a and the second buffer 12b.

Figure 4:
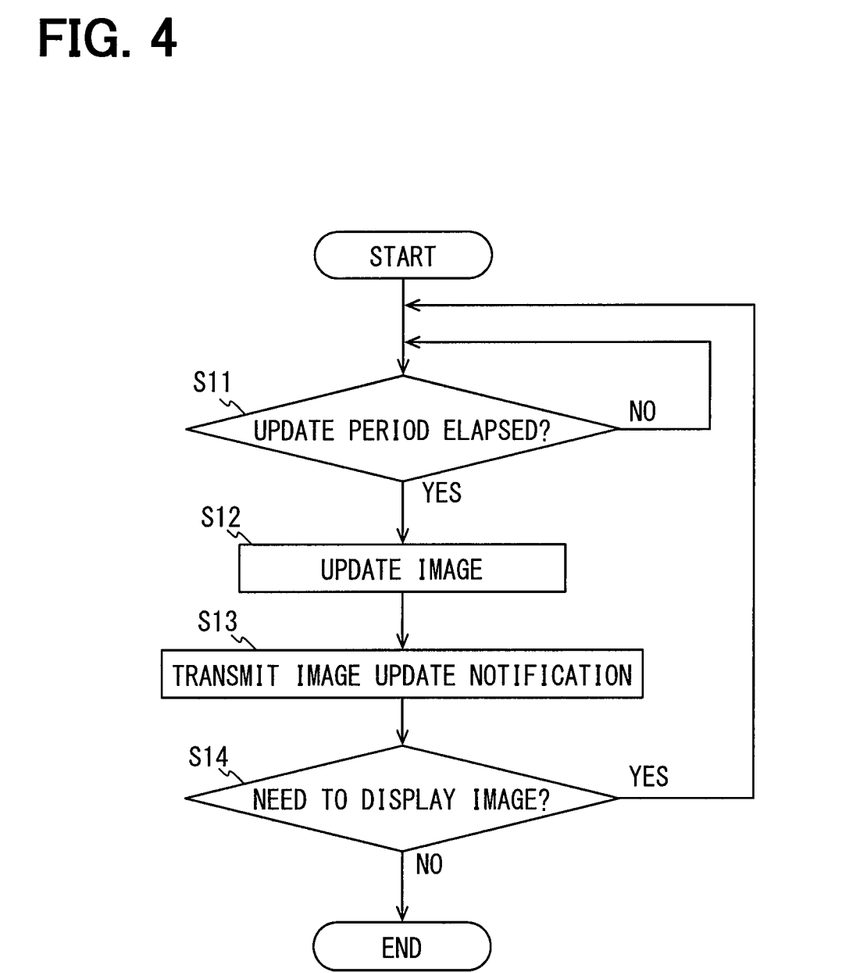
FIG. 4 is a flowchart showing a processing executed by a display output unit in FIG. 1.

FIG. 4 shows a processing executed by the display output unit 13. When the display control device 10 needs to display the image on the display screen 21, the display output unit 13 periodically executes the processing shown in FIG. 4. At S11, the display output unit 13 determines whether the update period has elapsed since the image displayed on the display screen 21 is updated last time. If the determination result at S11 is NO, the display output unit 13 repeats the determination at S11. On the other hand, if the determination result at S11 is YES, the processing proceeds to S12.

At S12, the display output unit 13 acquires the image data created in the buffer 12 different from the buffer 12 used in the previous image update, and updates the image displayed on the display screen 21. Although the update period is constant, the period of executing FIG. 4 fluctuates due to the fluctuation in the processing loads of the hardware and the software. As a result, the period for which the image is actually updated fluctuates.

At subsequent S13, the display output unit 13 transmits the image update notification. As described above, the image update notification is transmitted to the image creating unit 11. In addition, the image update notification is also transmitted to the update time measuring unit 14.

At S14, the display output unit 13 determines whether the display control device 10 still needs to display the image on the display screen 21. If the determination result at S14 is NO, the processing shown in FIG. 4 ends. On the other hand, if the determination result at S14 is YES, the processing returns to S11. As described above, each time the display output unit 13 determines that the update period has elapsed, the display output unit 13 updates the image to be displayed on the display unit 2.

Figure 5:
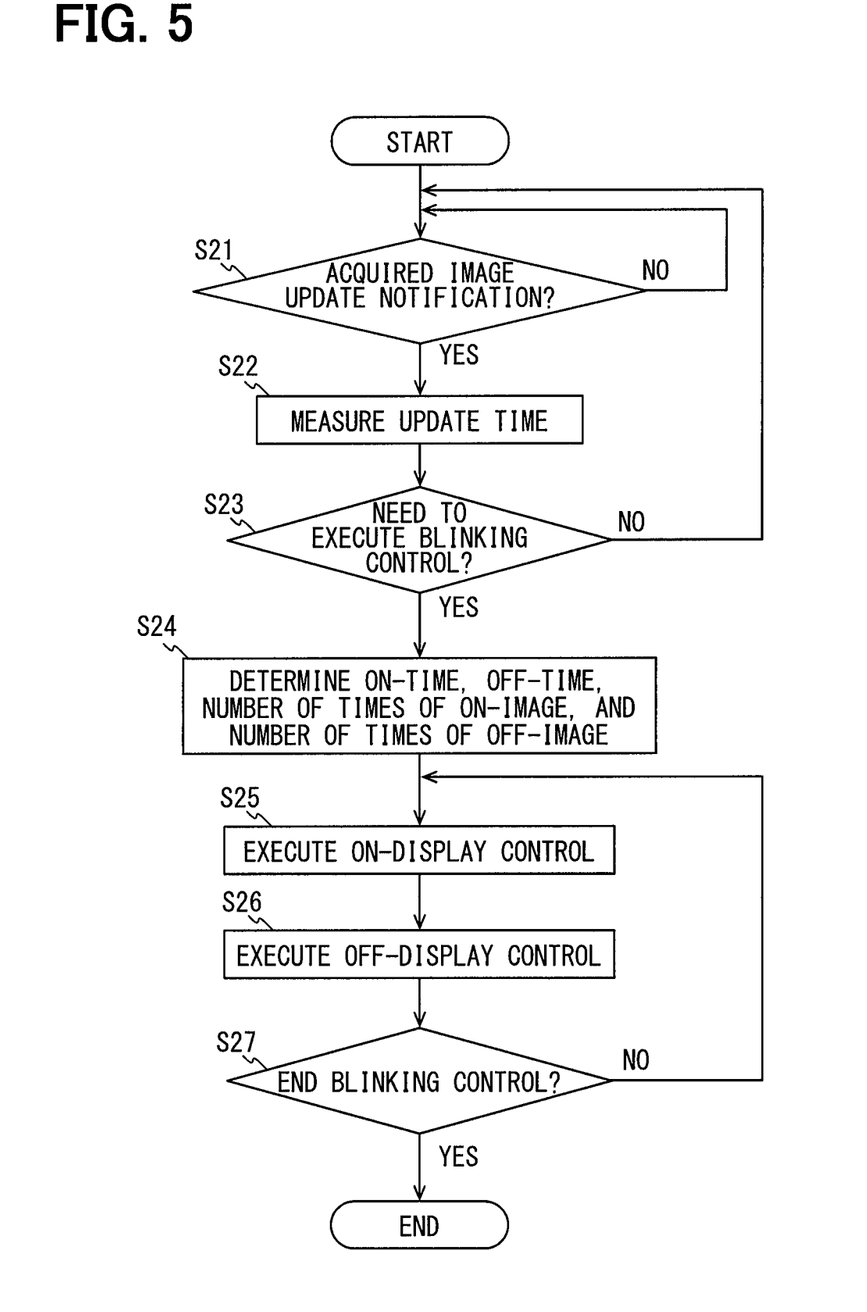
FIG. 5 is a flowchart showing a processing executed by an update time measuring unit and a blinking control unit in FIG. 1.

FIG. 5 shows a processing executed by the update time measuring unit 14 and the blinking control unit 15. In FIG. 5, the update time measuring unit 14 executes S21, 22, and the blinking control unit 15 executes S23 onwards, At S21, the update time measuring unit 14 determines whether the update time measuring unit 14 has acquired the image update notification. If the determination result at S21 is NO, the update time measuring unit 14 repeats the determination at S21. On the other hand, if the determination result at S21 is YES, the processing proceeds to S22. At S22, the update time measuring unit 14 measures a difference between a time at which the update time measuring unit 14 acquired the second-to-last image update notification and a time at which the update time measuring unit 14 acquired the last image update notification, as an update time.

At S23, the blinking control unit 15 determines whether needs to execute the blinking control. For example, in a case where the sonar is operating and the sonar detection image 40 is displayed on the display screen 21, a case where the distance to the obstacle detected by the sonar is equal to or less than the blinking threshold distance is an example of the case that requires the blinking control. If the determination result at S23 is NO, the processing returns to S21, and the update time measuring unit 14 repeatedly measures the update time.

Figure 6:
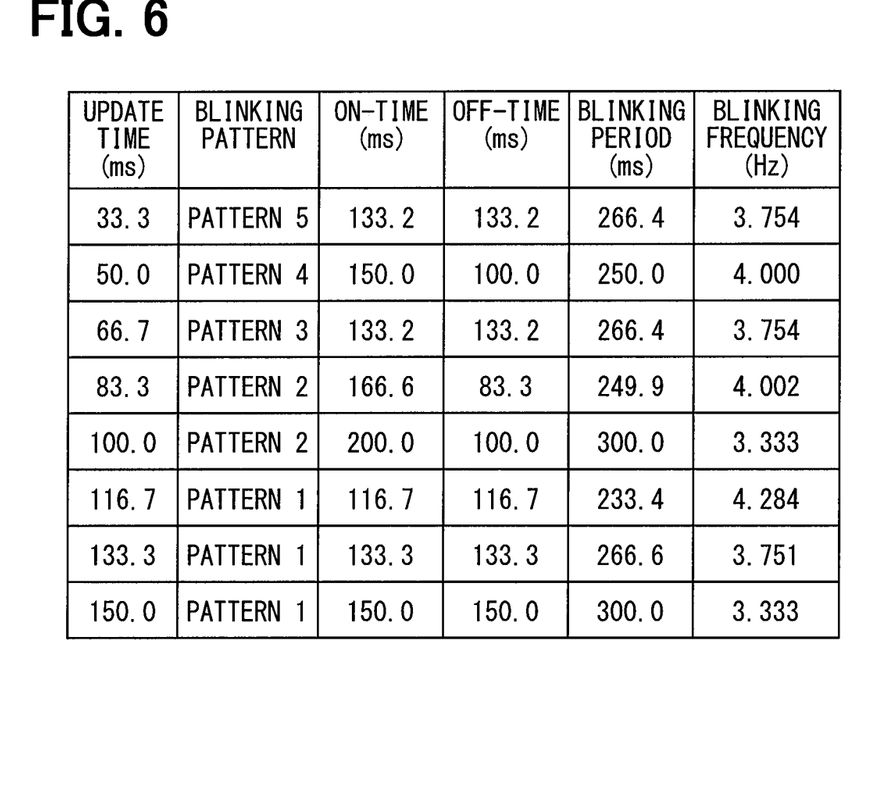
FIG. 6 is a diagram showing relationships among update times, blinking patterns, on-times, off-times, blinking periods, and blinking frequencies.

On the other hand, if the determination result at S23 is YES, the processing proceeds to S24. At S24, the blinking control unit 15 determines the on-time, the off-time, the number of times of on-image, and the number of times of off-image based on the latest update time. FIG. 6 is a diagram showing relationships among update times, blinking patterns, on-times, off-times, blinking periods, and blinking frequencies.

Even if the set value of the update time is a constant value, the update time actually measured may fluctuate due to the fluctuation in the processing loads of the hardware and the software included in the display control device 10. However, the screen can be updated only at every minimum update period determined from the constraints of the hardware. Therefore, the update time fluctuates at the minimum update period as a unit. In the present embodiment, the minimum update period is 16.6 milliseconds.

Since the minimum update period is 16.6 milliseconds, the actual update time that changes due to the fluctuation in the processing loads also becomes an integral multiple of 16.6 milliseconds. The update time 33.3 milliseconds is twice the minimum update period and the update time 50.0 milliseconds is three times the minimum update period. In a column of the update time in FIG. 6, an update time shown in each cell is a time obtained by adding the minimum update period for one time to an update time shown in a cell one row above.

In the present embodiment, the target blinking frequency, which is the control target value of the blinking frequency, is 4 Hz and ±20% of the target blinking frequency is the tolerance frequency. Therefore, the lower limit of the tolerance frequency is 80% of the target blinking frequency, that is, 3.2 Hz, and the upper limit of the tolerance frequency is 120% of the target blinking frequency, that is, 4.8 Hz.

Figure 7:
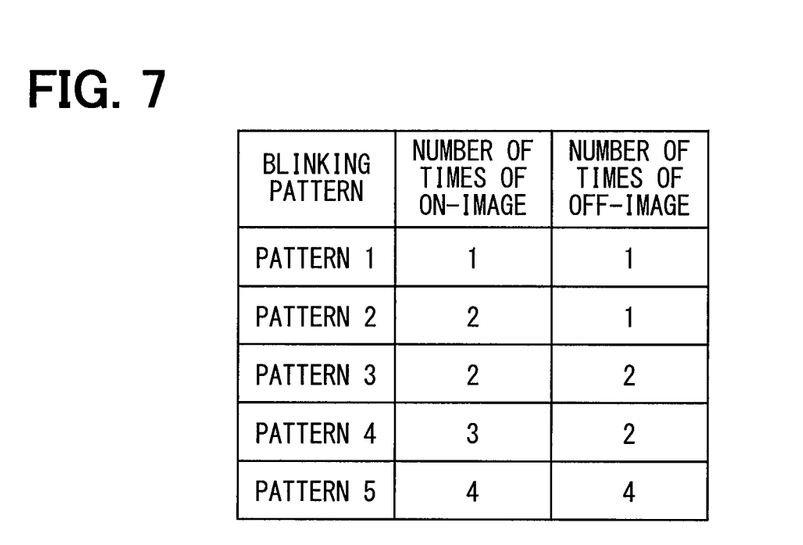
FIG. 7 is a diagram showing correspondences among blink patterns, the number of times of on-image, and the number of times of off-image.

The blinking pattern is a pattern in which the number of times to display the on-image and the number of times to display the off-image are determined. In the present embodiment, the blinking pattern is set from 1 to 5. FIG. 7 shows the correspondences among each blinking pattern, the number of times of on-image that is the number of times to display the on-image, and the number of times of off-images that is the number of times to display the off-image.

The on-image and the off-image are images alternately displayed during the blinking control, and are images having different brightness from each other. The on-image is an image in which a portion to be blinked is brighter than the off-image, and the off-image is an image in which the portion to be blinked is darker than the on-image. The darker state includes non-display. By alternately displaying the on-image and the off-image on the same position on the display screen 21, a viewer of the display screen 21 can recognize that the image is blinking. The on-image corresponds to a bright image, and the off-image corresponds to a dark image.

For example, in the sonar detection image 40 shown in FIG. 2, the on-image is an image in which the obstacle notifying FIG. 42 indicating the direction in which the obstacle was detected is displayed brightly, and the off-mage is an image in which the obstacle notifying FIG. 42 is displayed darkly.

In FIG. 6, the on-time is a time to display the on-image and the off time is a time to display the off-image. The blinking period is the sum of the on-time and the off-time, and the blinking frequency is the reciprocal of the blinking period. The on-time corresponds to the bright time, and the off-time corresponds to the dark time.

When the update time is 33.3 milliseconds, both the on-time and the off-time are 133.2 milliseconds. 133.2 milliseconds is four times the update time of 33.3 milliseconds. The blinking period is 266.4 milliseconds and the blinking frequency is 3.754 Hz. 3.754 Hz falls within the tolerance frequency range.

When the update time is 50.0 milliseconds, the on-time is 150.0 milliseconds and the off-time is 100.0 milliseconds. Thus, the on-time is three times the update time and the off-time is twice the update time. Unlike the case where the update time is 33.3 milliseconds, the on-time and the off-time are different from each other. This is because when 50 milliseconds is set as a unit, if the on-time and the off-time are set to be equal, the blinking frequency cannot fall within the tolerance frequency range.

In the case where the update time is 50.0 milliseconds, in order to make the blinking frequency within the tolerance frequency range, the on-time may also be set to 100.0 milliseconds and the off-time may also be set to 150.0 milliseconds contrary to the times shown in FIG. 6. However, in the situation where the blinking frequency fluctuates, it has been clarified by experiments that a viewer is less likely to feel uncomfortable when the on-time is longer if the same blinking frequency is used. Therefore, in the present embodiment, the on-time is made longer when the on-time and the off-time cannot be made equal in order to make the blinking frequency within the tolerance frequency range.

When the update time is 66.6 milliseconds, both the on-time and the off-time are 133.2 milliseconds. These on-time and off-time are twice the update time. These on-time and off-time are the same as when the update time is 33.3 milliseconds. Therefore, the blinking period and the blinking frequency are the same as when the update time is 33.3 milliseconds.

When the update time is 83.3 milliseconds, the on-time is 166.6 milliseconds and the off-time is 83.3 milliseconds. Therefore, the on-time is twice the update time, and the off-time is one time the update time. Due to these on-time and off-time, the blinking period is 249.9 milliseconds and the blinking frequency is 4.002 Hz.

When the update time is 100.0 milliseconds, the on-time is 200.0 milliseconds and the off-time is 100.0 milliseconds. Thus, the blinking period is 249.9 milliseconds and the blinking frequency is 4.002 Hz. When the update time is 116.7 milliseconds or more, both the on-time and the off-time are one time of the update time. The blinking frequencies shown in FIG. 6 are all within the tolerance frequency range. It is theoretically possible that the measured update time is shorter or longer than the update times shown in FIG. 6. However, in the present embodiment, even if the processing loads fluctuate, the update time corresponds to either of the cases shown in FIG. 6. Therefore, the relationships among the update time, the on-time and so on are set only for the update times shown in FIG. 6.

The number of times of on-image shown in FIG. 7 is a value obtained by dividing the on-time shown in FIG. 6 by the corresponding update time. The number of times of off-image shown in FIG. 7 is a value obtained by dividing the off-time shown in FIG. 6 by the corresponding update time.

At S24, the on-time, the off-time, and the blinking pattern are determined from the latest update time and the relationships shown in FIG. 6. Then, from the determined blinking pattern and the relationships shown in FIG. 7, the number of times of on-image and the number of times of off-image are determined.

At S25, the blinking control unit 15 executes an on-display control. In the on-display control, the blinking control unit 15 instructs the image creating unit 11 to create the on-image for the number of times of on-image determined at S24. Accordingly, the on-image is displayed on the display unit 2 for the on-time determined at S24.

At S26, the blinking control unit 15 executes an off-display control. In the off-display control, the blinking control unit 15 instructs the image creating unit 11 to create the off-image for the number of times of off-image determined at S24. Accordingly, the off-image is displayed on the display unit 2 for the off-time determined at S24.

At S27, the blinking control unit 15 determines whether to end the blinking control. For example, in a case where the sonar detection image 40 is blinkingly displayed, when the distance to the obstacle detected by the sonar becomes longer than the blinking threshold distance, the blinking control ends. If the determination result at S27 is NO, the processing returns to S25, and the on-display control and the off-display control are repeated. Accordingly, the blinking of the image is continued at the blinking frequency within the tolerance frequency range.

If the determination result at S27 is YES, the processing shown in FIG. 5 ends. In this case, after an execution period of the processing in FIG. 5 has elapsed, S21 is executed again.

In the display control device 10 according to the present embodiment, the update time measuring unit 14 successively measures the update time. Then, the blinking control unit 15 determines the on-time and the off-time as integral multiples of the update time. Because the on-time and the off-time are determined to integral multiples of the actually measured update time, a difference between the determined on-time and a time during which the on-image is actually displayed on the display unit 2 and a difference between the determined off-time and a time during which the off-image is actually displayed on the display unit 2 can be reduced.

After the on-time and the off-time are determined according to the update time, the on-time and the off-time are determined in such a manner that the blinking frequency falls within the tolerance frequency range. Because the actual blinking frequency can also fall within the tolerance frequency range, the fluctuation in the blinking period can be suppressed. Therefore, the display control device 10 is less likely to give an uncomfortable feeling to the viewer of the display unit 2 during the blinking display.

Furthermore, the display control device 10 determines the on-time to be longer than the off-time when needs to determine the on-time and the off-time to be different from each other in order to make the blinking frequency within the tolerance frequency range. Accordingly, the display control device 10 is less likely to give an uncomfortable feeling to the viewer of the display unit 2 during the blinking display. This is because, as described above, in a situation where the blinking frequency fluctuates, the viewer is less likely to feel uncomfortable when the on-time is longer if the same blinking frequency is used.

Although an embodiment of the present disclosure has been described above, the present disclosure is not limited to the above embodiment, and various modified examples described below are also included in the technical scope of the present disclosure. Furthermore, various modifications other than the following can be made without departing from the gist.

First Modified Example

In the above-described embodiment, the update time measuring unit 14 does not measure the update time during the execution of the blinking control. Therefore, the blinking control unit 15 determines the number of times of on-image and the number of times of off-image at the start of blinking control, and the number of times of on-image and the number of times of off-image are not changed during the blinking control.

However, the update time measuring unit 14 may sequentially measure the update time even during the blinking control, and the blinking control unit 15 may repeatedly determine the number of times of on-image and the number of times of off-image time based on the latest update time measured during the blinking control. In the present case, even when the update time fluctuates during the blinking control, the fluctuation in the blinking period can be well suppressed.

Second Modified Example

In the above-described embodiment, the sonar detection image 40 has been described as an example of the image to be blinked. However, the image to be blinked is not particularly limited. For example, in a case where a telltale is displayed on the display unit 2, the telltale may be blinked.

Third Modified Example

The display system 1 equipped with the display control device 10 may also be used in other than vehicles.

What is claimed is:

1. A display control device for displaying an image on a display unit, comprising:
   an image creating unit creating a bright image and a dark image included in the image;
   a display output unit (i) displaying the image created by the image creating unit on the display unit and (ii) outputting an image update notification when the display output unit updates the image displayed on the display unit;
   an update time measuring unit measuring a time difference between a time at which the update time measuring unit acquires a last image update notification and a time at which the update time measuring unit acquires a second-to-last image update notification, as an update time that is a time from when the image displayed on the display unit is updated until the image is updated next time; and
   a blinking control unit executing a blinking control in which the bright image and the dark image are alternately output to the display unit, wherein
   the blinking control unit determines a bright time during which the bright image is displayed on the display unit and a dark time during which the dark image is displayed on the display unit to be integral multiples of the update time measured by the update time measuring unit in such a manner that a blinking frequency determined from a sum of the bright time and the dark time falls within a tolerance frequency range determined based on a predetermined target blinking frequency, and
   when the blinking control unit executes the blinking control, the blinking control unit executes an on-display control to instruct the image creating unit to create the bright image for a number of times of a value obtained by dividing the bright time by the update time, and then executes an off-display control to instruct the image creating unit to create the dark image for a number of times of a value obtained by dividing the dark time by the update time, and repeats the on-display control and the off-display control until the blinking control ends.

2. The display control device according to claim 1, wherein
   the blinking control unit determines the bright time to be longer than the dark time in a case where the blinking control unit needs to determine the bright time and the dark time to be different from each other in order to make the blinking frequency within the tolerance frequency range.

3. The display control device according to claim 1, wherein
   the update time measuring unit sequentially measures the update time even during an execution of the blinking control, and
   the blinking control unit repeatedly determines the bright time and the dark time based on the update time that is sequentially measured during the execution of the blinking control.

4. The display control device according to claim 1, wherein
   the display control device and the display unit are installed in a vehicle.

5. The display control device according to claim 1, wherein
   the blinking control alternately displays the bright image for the bright time and the dark image for the dark time on the display unit to enable a viewer to recognize image blinking on the display unit.

6. A display control device for displaying an image on a display, comprising:
   a computer comprising a processor and a memory, the computer is configured to:
   create a bright image and a dark image included in the image;
   display the created image on the display and output an image update notification when the image displayed on the display is updated;
   acquire the image update notification and measure a time difference between a time of acquiring the last image update notification and a time of acquiring the second-to-last image update notification, as an update time that is a time from when the image displayed on the display is updated until the image is updated next time;
   execute a blinking control in which the bright image and the dark image are alternately output to the display; and
   determine a bright time during which the bright image is displayed on the display and a dark time during which the dark image is displayed on the display to be integral multiples of the measured update time in such a manner that a blinking frequency determined from a sum of the bright time and the dark time falls within a tolerance frequency range determined based on a predetermined target blinking frequency,
   wherein
   when executing the blinking control, execute an on-display control to create the bright image for a number of times of a value obtained by dividing the bright time by the update time, and then execute an off-display control to create the dark image for a number of times of a value obtained by dividing the dark time by the update time, and repeat the on-display control and the off-display control until the blinking control ends.

7. The display control device according to claim 6, wherein
   the display control device and the display are installed in a vehicle.

8. The display control device according to claim 6, wherein the blinking control alternately displays the bright image for the bright time and the dark image for the dark time on the display to enable a viewer to recognize image blinking on the display.

* * * * *